United States Patent [19]
Nolen, Jr.

[11] Patent Number: 5,188,646
[45] Date of Patent: Feb. 23, 1993

[54] ADJUSTABLE AIR FILTER

[75] Inventor: Edward F. Nolen, Jr., Memphis, Tenn.

[73] Assignee: Air Kontrol, Inc., Batesville, Miss.

[21] Appl. No.: 846,605

[22] Filed: Mar. 5, 1992

[51] Int. Cl.$^5$ .............................................. B03C 3/02
[52] U.S. Cl. ...................................... 55/155; 55/486; 55/496; 55/511; 55/DIG. 31; 55/528
[58] Field of Search ................. 55/155, 496, 486, 501, 55/511, 528, DIG. 31

[56] References Cited

U.S. PATENT DOCUMENTS

| | | |
|---|---|---|
| 1,122,437 | 12/1914 | Sweeney . |
| 2,175,903 | 10/1939 | Lichtman ............................ 183/74 |
| 2,802,544 | 8/1957 | Lewis .................................. 183/44 |
| 3,274,759 | 9/1966 | Bell .................................... 55/482 |
| 3,675,402 | 7/1972 | Weed .................................. 55/496 |
| 5,037,455 | 8/1991 | Scheineson .................. 55/DIG. 31 |
| 5,059,218 | 10/1991 | Pick ................................... 55/131 |

Primary Examiner—Bernard Nozick
Attorney, Agent, or Firm—Walker, McKenzie & Walker

[57] ABSTRACT

An adjustable air filter for use in heating, ventilating, cooling, and forced air systems. The air filter includes a media for filtering air and adapted to be cut with scissors, and a frame embracing the peripheral edges of the media. The frame includes a pair of male sections and a pair of female sections respectively telescopingly receiving the male sections. Also, the frame is adapted to be cut with scissors and is preferably formed of polyvinyl chloride. Each of the male sections includes a T-shaped projection and each of the female sections includes a complementary shaped T-shaped slot adapted to telescopingly receive the T-shaped projection for preventing inward separation of the sections from one another. In the preferred form the media is of the electrostatic type and includes at least one layer of polypropylene woven in an egg-crate pattern. Also, the layer preferably includes a pad of washable polyester material. At least one grid, having squares defining interstices, is formed of polypropylene and is heat staked onto the layer of polypropylene for permanent attachment thereto. Self-tapping screws are provided to lock the sections of the frame together against telescoping separation thereof.

10 Claims, 2 Drawing Sheets

ADJUSTABLE AIR FILTER

BACKGROUND OF THE INVENTION

1. Field of the Invention

The present invention relates, in general, to air filters, and in particular to an air filter for use in heating, ventilating, cooling, and forced air systems 2. Information Disclosure Statement There are typically relatively few popular sizes, e.g., five, of air filters used in homes and the like. On the other hand, there is a need for many different odd size filters. The problem generally occurs when contractors build a house. Rather than building the opening for the filter a standard size, a great many of the contractors will cut the size hole for whatever is convenient for them to cut. There are adjustable frames on the market in which one channel is telescopically received within another which may be relevant prior art to the present invention. However, none of these frames are completely satisfactory for one reason or another, for example, the telescoping channels are flimsy and difficult to assemble.

It is, therefore, desirable to have an air filter which is sturdy and easy to assemble.

A preliminary patentability search in Class 55, subclasses 501, 496, 503, 506, 511, 516, 481, 482 and digest 31, and Class 160, subclasses 372, 373 and 374, produced the following patents, some of which may be relevant to the present invention: Sweeney, U.S. Pat. No. 1,122,437, issued Dec. 29, 1914; Lichtman, U.S. Pat. No. 2,175,903, issued Oct. 10, 1939; Lewis, U.S. Pat. No. 2,802,544, issued Aug. 13, 1957; Bell, U.S. Pat. No. 3,274,759, issued Sept. 27, 1966; Weed, U.S. Pat. No. 3,675,402, issued Jul. 11, 1972; and Pick, U.S. Pat. No. 5,059,218, issued Oct. 22, 1991.

While each of the above patents disclose various filters and screens, none disclose or suggest the present invention. More specifically, none of the above patents disclose or suggest an air filter for use in heating, ventilating, cooling, and forced air systems in which an adjustable frame formed of a material adapted to be cut by a cutting device comprises at least one female section having at least one leg; at least one male section having at least one leg telescopingly mated with said female section; coacting means on said leg of said female section and on said leg of said male section for permitting lengthwise telescoping movement of said leg of said male section and said leg of said female section relative to one another and yet preventing inward separation of said leg of said female section from said leg of said male section; and locking means for locking said leg of said female section and said leg of said male section in a fixed assembled position relative to one another.

Sweeney, U.S. Pat. No. 1,122,437 discloses a screen that is adjustable in one direction to fit a window. The end portions of the screen are provided with dovetailed tongues which can be gripped by the end portions of the side strips.

Lichtman, U.S. Pat. No. 2,175,903 discloses an adjustable air filter which may be adjusted as to size and attached to various types of hot air registers in homes, offices, and other buildings. The frame is made of four L-shaped sections formed as channel members which telescope with adjacent channel members. There are wing screws to hold the telescoping sections in predetermined positions. The sections are provided with barbs intended to permit the filter element t be impaled thereon.

Lewis, U.S. Pat. No. 2,802,544 discloses a filter screen for fluids wherein the filtering medium is a brush or a plurality of brushes. The filter has a four sided rectangular metal frame with each side being in the form of a channel. The filter screen further comprises rectangular front and rear sheets of expanded metal. The assembly is held in place within the frame by four clamping plates having wing nuts for holding the clamping plates in position.

Bell, U.S. Pat. No. 3,274,759 discloses an adjustable frame structure for air filters and the like adapted for use as window screens or ventilators. The adjustable frame structure includes a first and second generally rectangular frame with each frame including a pair of rails and a pair of end-frame members. Each of the rails has a key-retaining guideway therein. One end frame member of each of the frames has a pair of key members slidably retained in the guideway of the other frame and longitudinally slidable to hold the two frames in confronting, overlapping slidable relationship.

Weed, U.S. Pat. No. 3,675,402 discloses an adjustable filter assembly adapted to be inserted in apertures of buildings such as windows or doors or the like. The frame assembly is telescopically adjustable in two different directions and is provided with a clamp for holding the adjustment at any desired predetermined size or shape within the confines of its adjustment limits.

Pick, U.S. Pat. No. 5,059,218 discloses a construction for supporting a flexible screen or sheet such as a window screen, or the like, and its application to the assembly of an electrostatic air filter of the charged media type. The filter includes a U-shaped channel adapted to receive a spline member for frictionally engaging a flexible sheet such as a window screen.

SUMMARY OF THE INVENTION

The present invention is a permanent type air filter for use in heating, ventilating, cooling, and forced air systems. The filter includes a media having its edges received in and supported by a trimable channel frame, which has two male sections telescopically coacting with two female sections to permit size variations, both horizontally and vertically, by cutting the media and adjusting the frame to the desired size. The frame has T-shaped sections and complementary shaped slots telescopically receiving the projections for providing sturdiness to the frame. After the desired size is obtained, self tapping screws are installed to make the size permanent. Then, subsequently, if it is desired to open the frame, the screws are removed.

In the preferred embodiment, the media includes two layers of woven fabric in an egg-crate pattern and formed of polypropylene material. One layer of material is on the inlet side of the filter and the other layer is on the discharge side thereof. The center of the media includes a washable polyester pad sandwiched between the two layers of polypropylene material. It will be understood that the media may be any other type without departing from the spirit and scope of the present invention.

It is an object of the present invention to provide a sturdy and improved permanent type air filter for use in heating, ventilating, cooling, and forced air systems which has an easily trimmed media and easily adjusted frame. On the other hand, if a smaller frame is desired, the frame can be cut to a smaller size.

A further object is to provide an improved media assembly of the electrostatic type which includes grids having enlarged squares establishing interstices and with the grids being respectively heat staked onto the electrostatic components.

DESCRIPTION OF THE PREFERRED EMBODIMENT

Figure 1:
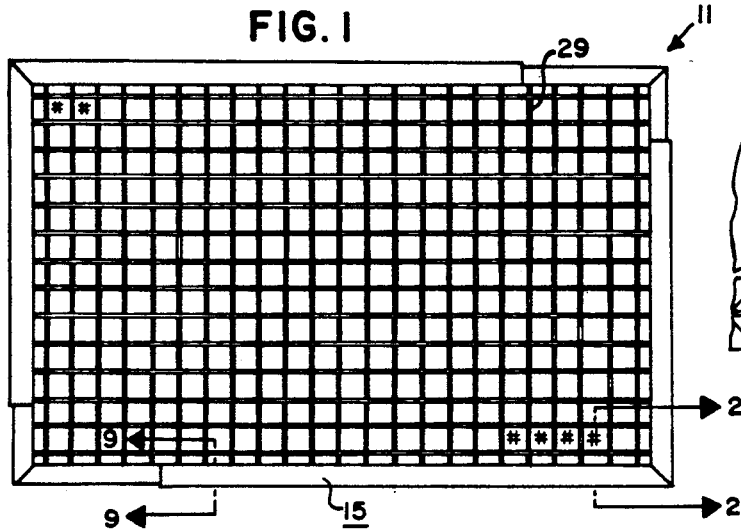
FIG. 1 is a front elevational view of the assembled filter of the present invention.

Referring to the drawings, the filter 11 of the present invention includes in general a filter media 13 and a frame 15. When filter 11 is in an assembled condition, as shown in FIG. 1, frame 15 surrounds the peripheral outer edge portions 17 of media 13 to support the media.

In the preferred form, media 13 is an electrostatic type and preferably includes a pair of electrostatic layers 19, 21, of a construction well known to those skilled in the art, and a center pad 23 disposed between layers 19, 21. However, it will be understood that media 13 may be any other type without departing from the spirit and scope of the present invention.

Filter 11 is symmetrical so that either side can be the air inlet side with the opposite side being the air outlet side. However, for purposes of clarity, the side 25 will be considered the inlet side and side 27 the outlet side. Thus, layer 19 is on the inlet side 25 of filter 11 and layer 21 is on the outlet side 27 of the filter 11. In other words, the air being filtered passes through the filter 11 from the left as viewed in FIG. 9 to the right thereof, i.e., from inlet side 25 through the filter 11 and out the outlet side 27.

Figure 7:
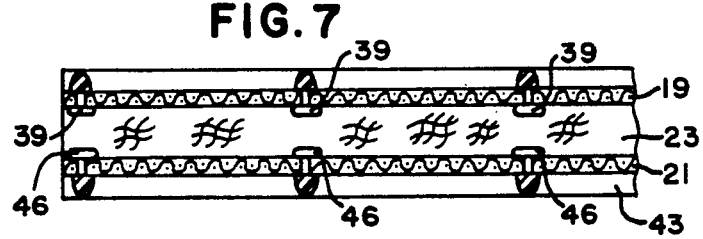
FIG. 7 is a view similar to FIG. 6 but showing the media in an assembled relationship.
Figure 9:
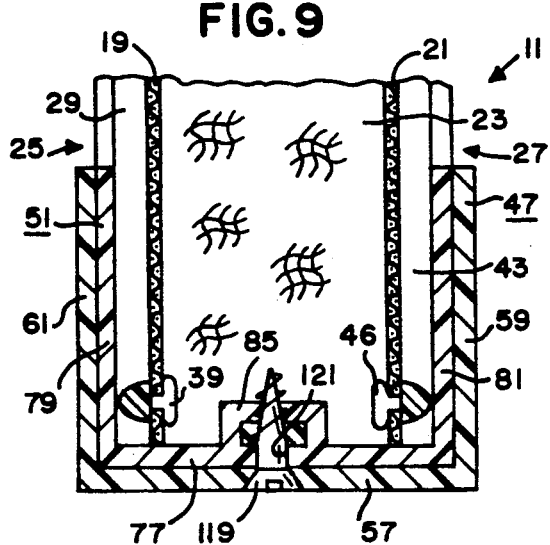
FIG. 9 is an enlarged sectional view taken as on the line 9—9 of FIG. 1.

Layers 19, 21 are preferably identical in construction and the following description of layer 19 will suffice for both. Layer 19 consists of woven fabric of an egg-crate pattern well known to those skilled in the art and is preferably formed of a polypropylene material. As is known by those skilled in the art, polypropylene attracts microsize particles down to 1, 2 and 3 micron size. The layer 19 is the same on both sides and functions in the same manner regardless of which face of the layer 19 is turned towards the oncoming air. In the assembled condition, the center pad 23 is sandwiched between layers 19, 21, as best seen in FIGS. 7 and 9. Center pad 23 in the preferred form consists of a washable polyester pad of approximately ½ inch (1.27 cm) in thickness.

Layer 19 is covered on the inlet side 25 with a grid 29 having a multiplicity of squares 31 made of polypropylene. The squares are preferably approximately 1 inch (2.54 cm) by 1 inch (2.54 cm) and each square 31 is formed of four legs 33 which are shared with adjacent squares to establish interstices 35 with each being formed by four of the legs 33 and through which the air passes. Grid 29 is for stiffening purposes and is permanently attached to layer 19, preferably by staking the grid 29 to the layer 19 by the following means.

Figure 6:
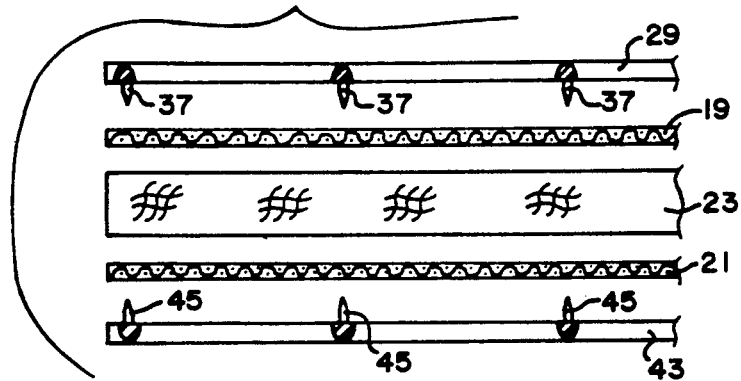
FIG. 6 is an enlarged sectional view taken as on the line 6—6 of FIG. 3 with the media being shown in a disassembled relationship.

At each of the intersections of legs 33, is provided a pointed pin 37 extending inwardly towards layer 19, as best seen in FIG. 6. In the assembly of grid 29 with layer 19, grid 29 is brought into contact with layer 19 whereupon pins 37 extend through the woven fabric of layer 19 and to the opposite side thereof. The distal ends of pins 37 are brought into contact with heat and pressure whereupon buttons 39 are formed so that when the polypropylene cools, a permanent attachment is provided between the layer 19 and the grid 29.

The layer 21 and grid 43 are permanently attached to one another in the same manner as heretofore described relative to layer 19 and grid 29 so that the pointed ends of pins 45 on grid 43 are formed into buttons 46.

Figure 4:
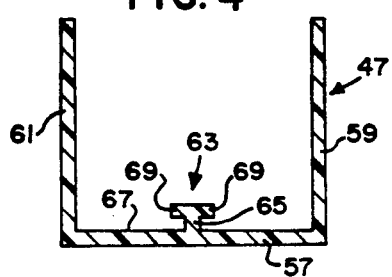
FIG. 4 is an enlarged sectional view taken as on the line 4—4 of FIG. 3.

Frame 15 includes two male sections 47, 49, which are preferably identical with one another, and two female sections 51, 53 which are also preferably identical with one another. Since male sections 47, 49 are identical, the following description of male section 47 will suffice for both. Male section 47 is channel-shaped along the entire length thereof except for the corner 55 as will be understood in the description to follow. Thus, male section 47 includes a web 57 and spaced flanges 59, 61 respectively integrally formed with the edges of web 57 and extending perpendicularly therefrom as best seen in FIG. 4. Male section 47 includes a projection 63 extending longitudinally of male section 47 along the entire length thereof except for the corner 55, as will be better understood in the description to follow. Projection 63 in cross section, as seen in FIG. 4 is preferably T-shaped and includes a stem 65 integrally attached to web 57 at the inner surface 67 thereof and which stem extends perpendicularly from the inner surface. Projection 63 includes laterally extending portions 69 extending outwardly in opposite directions from the distal or opposite end of stem 65 from surface 67. Portions 69 are preferably integrally attached to stem 65 and stem 65 is preferably integrally attached to web 57.

Figure 3:
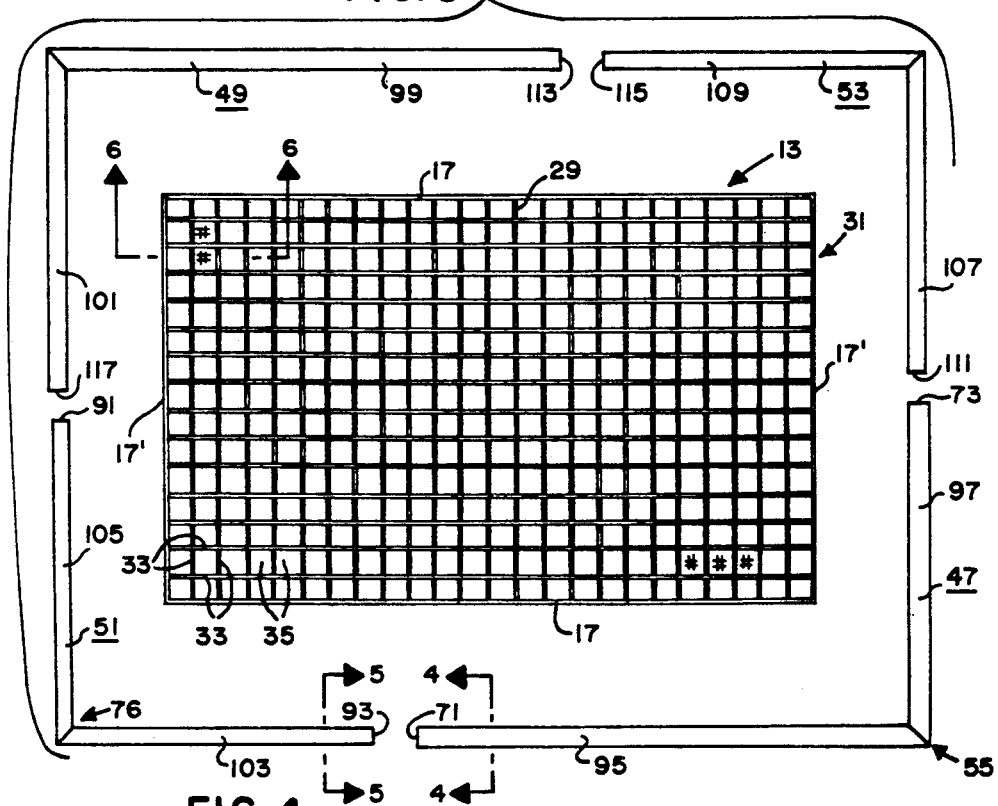
FIG. 3 is a view of the filter of FIG. 1 shown in a disassembled disposition.
Figure 8:
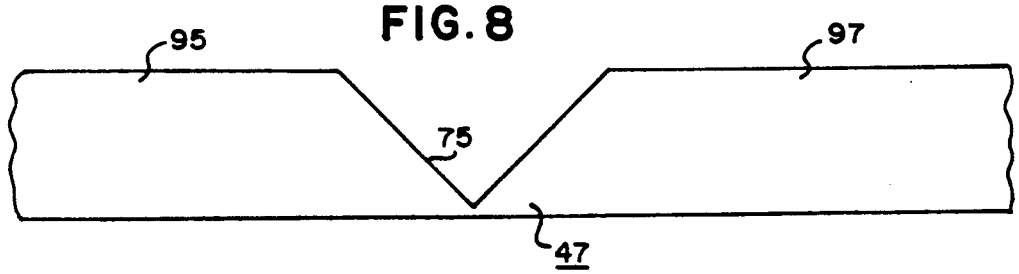
FIG. 8 is an enlarged side elevational view of a portion of the frame showing the V-shaped cut therein to provide the means for forming a corner of the frame.

Male section 47 is preferably extruded and formed of PVC (polyvinyl chloride). Thus, male section 47 is preferably integrally formed into one piece of material which is cut to the desired length. Intermediate the opposite ends 71, 73 of male section 47 a V-shaped cut 75 is provided in male section 47 through the flanges 59, 61. The V-shaped cut 75 is preferably formed with the sides of the cut extending substantially perpendicularly to one another, as best seen in FIG. 8, so that male section 47 may be bent to establish corner 55. It will be understood that the V-shaped cut 75 is cut through the T-shaped projection 63 but not through the web 57 so that web 57 may be bent to the above described perpendicular relationship and T-shaped projection 63 will not interfere with the bending thereof. In other words, the portion of the web 57 at the appex or bottom of the V-shaped cut 75 acts as a hinge to permit the bending of the portions of male section 47 to the perpendicular relationship shown in FIG. 3.

Figure 2:
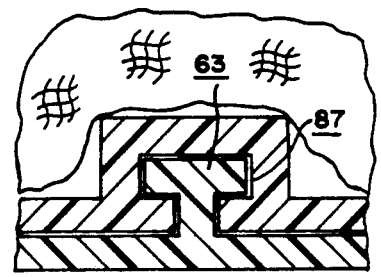
FIG. 2 is an enlarged fragmentary sectional view taken as on the line 2—2 of FIG. 1.
Figure 5:
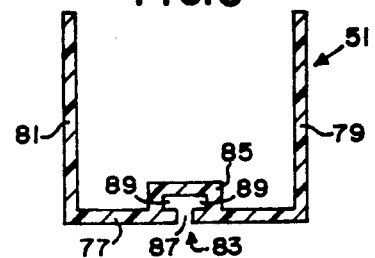
FIG. 5 is an enlarged sectional view taken as on the line 5—5 of FIG. 3.

Since female sections 51, 53 are identical with one another, the following description of female section 51 will suffice for both. Female section 51 is channel-shaped along the entire length thereof except for the corner 76 as will be understood in the description to follow. Thus, female section 51 includes a web 77 and spaced flanges 79, 81 respectively integrally formed with the edges of web 77 and extending perpendicularly therefrom as best seen in FIG. 5. Female section 51 includes a slot 83 extending longitudinally of female section 51 along the entire length thereof except for the corner 76, as will be better understood in the description to follow. Slot 83 in cross section, as seen in FIG. 5, is preferably T-shaped and is preferably formed in a rib 85 integrally attached to web 77 and extending inwardly therefrom. Slot 83 includes a narrow portion 87 extending inwardly through web 77 from the outside thereof and includes portions 89 communicated with the inner end of narrow portion 87 and extending laterally in opposite directions therefrom. Thus, slot 87 is complementary shaped and sized relative to projection 63 to closely telescopically receive projection 63 as best seen in FIG. 2.

Female section 51 is preferably extruded and formed of PVC (polyvinyl chloride). Thus, female section 51 is preferably integrally formed into one piece of material which is cut to the desired length. Intermediate the opposite ends 91, 93 of female section 51 is provided a V-shaped cut 75 like V-shaped cut 75 in female section 51 through flanges 79, 81. As with the V-shaped cut 75 the V-shaped cut in female section 51 is preferably formed with the sides of the cut extending substantially perpendicularly to one another so that female section 51 may be bent to establish corner 76 in the same manner that corner 55 was established as heretofore described.

From the foregoing it will be understood that each of the sections 47, 49, 51, and 53 when bent at the corners thereof have legs which are perpendicular to one another. Thus, first male section 47 has legs 95, 97 which are perpendicular, second male section 49 has legs 99, 101 which are perpendicular, first female section 51 has legs 103, 105 which are perpendicular, and second female section 53 has legs 107, 109 which are perpendicular.

The lengths of the male sections 47, 49 and female sections 51, 53 are made long enough so that the largest or maximum size filter that is contemplated can be accommodated. Thus, for example, in most cases a 20 inch (50.8 cm) by 25 (63.5 cm) inch filter size will be large enough, but, of course, if desired, it could be larger. The lengths of the individual male sections, 47, 49 and female sections 51, 53 are determined by the maximum size of filter desired and so that the distal ends of the male and female sections will overlap a sufficient amount, as for example, by several inches in order that the filter will be sturdy. It is contemplated that the media 13 will be of a size to match the maximum size of the frame 15 and that the components of the media will be substantially the same size. In other words, electrostatic layers 19, 21 with the grids 29, 43 attached thereto and the center pad 23 will all be of the same size which is adapted to fit into the maximum size frame 15.

Also, it is contemplated that the customer will buy a kit of parts including the male sections 47, 49, female sections 51, 53, and media 13; and would then cut the components down from the maximum size. However, if the maximum size were the size desired, there would be no need for any trimming to take place, and if the legs of the frame 15 were of such lengths that the frame 15 could be telescoped down to the desired size then there would be no need to cut frame 15. It should be pointed out that the media 13, as well as the components of frame 15, are easily cut with cutting devices. Thus, media 13 is easily cut with scissors or the like and frame 15 is easily cut with a heavier cutting device such as cutting snips, shears or the like. Then, after the media 13 and frame 15 is either cut or telescoped down to the desired size, the filter is assembled around the edges 17 of media 13 so that the edges of the media are embraced and held by the frame 15. It will be understood that in the above step, the distal ends 71, 73, 113, and 117 of the male sections 47, 49 are respectively telescoped with the distal ends 93, 111, 115, and 91 of the female sections 51, 53. Thus, for example, end 71 of male section 47 is aligned with end 93 of female section 51 and the two are brought together so that projection 63 extends into T-slot 83 with flanges 59, 61 of male section 47 being respectively on the outside of flanges 81, 79 of female section 51, and with web 57 of male section 47 being on the outside of web 77 of female section 51 so that the male section 47 and female section 51 may be slidingly telescoped together until the desired length of the frame 15 is reached in which the end edges 17' of the media 13 is embraced and held by the respective male section 47 and female section 51. When the frame 15 is telescoped down to the desired size embracing the respective edges 17, 17' of the media 13, the female and male sections are semi-permanently attached together preferably by means of screws 119 (only one of which is shown), but there is preferably a screw 119 at each of the overlapped portions of the legs 95, 97, 99, 101, 103, 105, 107, and 109 of male and female sections 47, 49, 51, and 53. To accomplish the above mentioned attachment by screws 119, a hole 121 is preferably provided adjacent each of the ends 71, 73, 113 and 117 of male sections 47, 49. The attachments at each of the four above mentioned overlapped portions are preferably substantially alike and the following description relative to the attachment at the overlapped portions of legs 95 and 103 should suffice for all. Hole 121 extends through web 57 and is preferably spaced approximately one inch from the distal end of leg 95. Screw 119 may be inserted through hole 121. Since screw 119 is self tapping, when it is turned, it will rupture rib 85 of female section 51, as seen in FIG. 9, so that legs 95 and 103 are locked together. Then, if it is ever desired to disassemble filter 11, the screws 119 may be removed.

From the foregoing it will be apparent with the coaction of the projections 63 in sections 47, 49 and the slots 83 in sections 51, 53, a very sturdy and rigid filter 11 is provided which is easy to assemble. Thus, the coaction of the projections 63 and slots 83 permits lengthwise telescoping movement of the legs of the male sections and the legs of the female sections relative to one another and yet prevent inward separation of the legs of the female sections from the legs of the male sections. It will be understood that when the term "preventing inward separation" is used herein it will be deemed to mean preventing the separation of the legs of the female sections from the legs of the male sections in a direction toward the center of the filter, i.e., in a direction which extends perpendicular to the longitudinal axes of the legs of the sections. Also, there is provided a filter 11 which is very efficient in operation due to the large interstices 35 and which can be easily trimmed to size due to the narrow legs 33 of the squares 31 as well as the ease of trimming or cutting due to the materials used in the media 13 and frame 15.

Although the present invention has been described and illustrated with respect to a preferred embodiment and a preferred use therefor, it is not to be so limited since modifications and changes can be made therein which are within the full intended scope of the invention.

I claim:

1. An air filter for use in heating, ventilating, cooling, and forced air systems, said air filter including an adjustable frame having four sides, said frame comprising:
   (a) at least one female section having at least one channel-shaped leg;
   (b) at least one male section having at least one channel-shaped leg telescopingly mated with said female section to establish one of said sides of said frame;
   (c) coacting means on said leg of said female section and on said leg of said male section for permitting lengthwise telescoping movement of said leg of said male section and said leg of said female section relative to one another and yet preventing inward separation of said leg of said female section from said leg of said male section, said coacting means including a T-shaped projection attached to said male section and extending longitudinally of said male section and a slot in said female section extending longitudinally of said female section, said slot being complementary shaped and sized relative to said projection for closely telescopically receiving said projection; and
   (d) locking means for locking said leg of said female section and said leg of said male section in a fixed assembled position relative to one another.

2. The air filter of claim 1 in which said male section and said female section are formed of polyvinyl chloride.

3. An adjustable air filter for use in heating, ventilating, cooling, and forced air systems, said air filter comprising:
   (a) media means for filtering air, said media means having a peripheral edge; and
   (b) frame means embracing said peripheral edge of said media means; said frame means including:
      (i) a pair of female sections each having a channel-shaped first leg and a channel-shaped second leg perpendicular to said first leg;
      (ii) a pair of male sections each having a channel-shaped first leg and a channel-shaped second leg perpendicular to said first leg, said first legs of said male sections being respectively telescopingly mated with said second legs of said female sections and said second legs of said male sections being respectively telescopingly mated with said first legs of said female sections to establish four sides to said frame means; and
      (iii) coacting means on said first and second legs of said female sections and on said first and second legs of said male sections for permitting telescoping movement of said first legs of said male sections and said second legs of said female sections relative to one another and yet preventing inward separation of said first legs of said female sections from said second legs of said male sections and preventing inward separation of said second legs of said female sections from said first legs of said male sections, said coacting means including T-shaped projections respectively attached to said male sections and extending longitudinally of said male sections to which attached and slots respectively in said female sections extending longitudinally of said female sections, said slots being complementary shaped and sized relative to said projections for closely telescopically receiving said projections.

4. The air filter of claim 3 in which said male sections and said female sections are formed of polyvinyl chloride.

5. The air filter of claim 3 in which said media means includes at least one electrostatic layer and at least one grid including a multiplicity of squares having intersecting legs establishing interstices for the passage of air therethrough.

6. The air filter of claim 5 which includes button means for permanently attaching said grid to said layer.

7. An adjustable air filter for use in heating, ventilating, cooling, and forced air systems, said air filter comprising:
   (a) media means for filtering air, said media means having a peripheral edge and said media means being formed of a material as may be cut with scissors; and
   (b) a frame formed of a material as may be cut with scissors, said frame embracing said peripheral edge of said media means and including:
      (i) a first female section having a first leg and a second leg substantially perpendicular to said first leg of said first female section, said first female section being channel-shaped in cross section and each leg thereof including a web and a pair of spaced flanges;
      (ii) a second female section having a first leg and a second leg substantially perpendicular to said first leg of said second female section, said second female second being channel-shaped in cross section, and each leg thereof including a web and a pair of spaced flanges;
      (iii) a first male section having a first leg and a second leg substantially perpendicular to said first leg of said first male section, said first male section being channel-shaped in cross section, and each leg thereof including a web and a pair of spaced flanges, said first leg of said first male section being telescopically mated with said second leg of said first female section for movement of said first leg of said first male section and said second leg of said first female section lengthwise relative to one another with said web of said first leg of said first male section being adjacent said web of said second leg of said first female section, and said second leg of said first male section being telescopically mated with said first leg of said second female section for movement of said second leg of said first male section and said first leg of said second female section lengthwise relative to one another with said web of said second leg of said first male section being adjacent said web of said first leg of said second female section;
      (iv) a second male section having a first leg and a second leg substantially perpendicular to said first leg of said second male section, said second male section being channel-shaped in cross section, and each leg thereof including a web and a pair of spaced flanges, said first leg of said second male section being telescopically mated with said second leg of said second female section for movement of said first leg of said second male section and said second leg of said second female section lengthwise relative to one another with said web of said first leg of said second male section being adjacent said web of said second leg of said second female section, and said second leg of said second male section being telescopically mated with said first leg of said first female section for movement of said second leg of said second male section and said first leg of said first female section lengthwise relative to one another with said web of said second leg of said second male section being adjacent said web of said first leg of said first female section;

(v) coacting means on said first and second female sections and on said first and second male sections for permitting telescoping movement of said first and second female sections and yet for preventing inward separation of said first leg of said first female section from said second leg of said second male section, for preventing inward separation of said second leg of said first female section from said first leg of said first male section, for preventing inward separation of said first leg of said second female section from said second leg of said first male section, and for preventing inward separation of said second leg of said second female section from said first leg of said second male section, said coacting means including T-shaped projections respectively attached to said male sections and extending longitudinally of the male sections to which attached; ribs respectively attached to said female sections and extending inwardly from said webs of said female sections; and T-shaped slots respectively in said female sections extending through said webs of said female sections and into said ribs; said slots being complementary shaped and sized relative to said projections for closely telescopically receiving said projections; and (vi) locking means for locking said first and second female sections and said first and second male sections in a fixed assembled position relative to one another.

8. The air filter of claim 7 in which said locking means includes at least one aperture through said web of one of said female sections and at least one self-tapping screw extending through said aperture, through said T-shaped slot of said one of said female sections and into said rib of said one of said female sections.

9. The air filter of claim 8 in which said male sections and said female sections are formed of polyvinyl chloride such as may be cut to any desired length; in which said media includes at least one electrostatic layer formed of polypropylene such as may be cut to any desired size and a pad formed of washable polyester such as may be cut to any desired size; in which is included at least one grid formed of polypropylene such as may be cut to any desired size; and in which polypropylene attachment means is provided for permanently attaching said grid to said electrostatic layer.

10. An adjustable frame for use in heating, ventilating, cooling, and forced air systems, said frame having four sides and comprising:

(a) at least one female section having at least one channel-shaped leg;

(b) at least one male section having at least one channel-shaped leg telescopingly mated with said female section to establish one of said sides of said frame;

(c) coacting means on said leg of said female section and on said leg of said male section for permitting lengthwise telescoping movement of said leg of said male section and said leg of said female section relative to one another and yet preventing inward separation of said leg of said female section from said leg of said male section, said coacting means including a T-shaped projection attached to said male section and extending longitudinally of said male section and a slot in said female section extending longitudinally of said female section, said slot being complementary shaped and sized relative to said projection for closely telescopically receiving said projection; and (d) locking means for locking said leg of said female section and said leg of said male section in a fixed assembled position relative to one another.

* * * * *